United States Patent
Li et al.

(10) Patent No.: US 9,632,829 B2
(45) Date of Patent: Apr. 25, 2017

(54) DISTRIBUTED STORAGE ALLOCATION FOR HETEROGENEOUS SYSTEMS

(71) Applicant: CALIFORNIA INSTITUTE OF TECHNOLOGY, Pasadena, CA (US)

(72) Inventors: Zhao Li, San Mateo, CA (US); Tracey C. Ho, Pasadena, CA (US); Derek Leong, Pasadena, CA (US); Hongyi Yao, Redwood City, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 372 days.

(21) Appl. No.: 14/210,181

(22) Filed: Mar. 13, 2014

(65) Prior Publication Data
US 2014/0281345 A1   Sep. 18, 2014

Related U.S. Application Data

(60) Provisional application No. 61/784,282, filed on Mar. 14, 2013.

(51) Int. Cl.
*G06F 12/00* (2006.01)
*G06F 9/50* (2006.01)
*G06F 3/06* (2006.01)

(52) U.S. Cl.
CPC .......... *G06F 9/5016* (2013.01); *G06F 3/0614* (2013.01); *G06F 3/0631* (2013.01); *G06F 3/0689* (2013.01)

(58) Field of Classification Search
None
See application file for complete search history.

(56) References Cited

U.S. PATENT DOCUMENTS 8,645,654 B1 * 2/2014 Bailey ................... G06F 3/0605
                                                                    711/165
2001/0044879 A1   11/2001 Moulton et al.
(Continued)

FOREIGN PATENT DOCUMENTS

WO    00/31640    6/2000
WO    01/61491    8/2001

OTHER PUBLICATIONS

J.-S. Wu and R.-J. Chen, "An algorithm for computing the reliability of weighted-k-out-of-n systems," IEEE Trans. Rel., vol. 43, No. 2, pp. 327-328, Jun. 1994.
(Continued)

*Primary Examiner* — Baboucarr Faal
(74) *Attorney, Agent, or Firm* — Steinfl + Bruno LLP

(57) ABSTRACT

Allocation of storage budget in a computer-based distributed storage system is described, where associated computer-based storage nodes have heterogeneous access probabilities. The problem is to allocate a given storage budget across the available computer-based nodes so as to store a unit-size data object (e.g. file) with a higher reliability (e.g. increased probability for the storage budget to be recovered). Efficient algorithms for optimizing over one or more classes of allocations are presented. A basic one-level symmetric allocation is presented, where the storage budget is spread evenly over an appropriately chosen subset of nodes. Furthermore, a two-level symmetric allocation is presented, where the budget is divided into two parts, each spread evenly over a different subset of computer-based storage nodes, such that the amount allocated to each node in the first subset is twice that of the second subset. Further expansion of the two-level symmetric allocation is provided with a three-level and a generic k-level symmetric allocation.

17 Claims, 19 Drawing Sheets

Table I

| Budget $T$ | Optimal allocation $(x_1, x_2, x_3)$ |
|---|---|
| $1 \leq T < \frac{3}{2}$ | $(1,0,0)$ |
| $\frac{3}{2} \leq T < 2$ | $(1,0,0)$ if $-p_1 + p_1p_2 + p_1p_3 + p_2p_3 - 2p_1p_2p_3 \leq 0$<br>$(\frac{1}{2}, \frac{1}{2}, \frac{1}{2})$ if $-p_1 + p_1p_2 + p_1p_3 + p_2p_3 - 2p_1p_2p_3 \geq 0$ |
| $2 \leq T < 3$ | $(1,1,0)$ |

(56) References Cited

U.S. PATENT DOCUMENTS

2010/0115216 A1    5/2010   Jia et al.
2010/0235843 A1    9/2010   Appa et al.

OTHER PUBLICATIONS

Y. Chen, J. Chen, and Y. Yang, "Multi-hop delay performance in wireless mesh networks," Mobile Netw Appl, vol. 13, pp. 160-168, Mar. 2008.

Leong, D. et al., "Distributed Storage Allocations" Jun. 2012 pp. 1-21.

Lin, W.K. et al., "Erasure Code Replication Revisited" *4th International Conference on Peer-to-Peer Computing. IEEE* (2004) pp. 1-8.

Tsirigos, A. et al., "Analysis of Multipath Routing—Part I: The Effect on the Packet Delivery Ratio" *IEEE Transactions on Wireless Communications*, vol. 3, No. 1 Jan. 2004, pp. 138-146.

Tsirigos A. et al., "Analysis of Multipath Routing, Part 2: Mitigation of the Effects of Frequently Changing Network Topologies" *IEEE Transactions on Wireless Communications* vol. 3, No. 2 Mar. 2004, pp. 500-511.

Ntranos, V. et al., "Allocations for Heterogenous Distributed Storage" Feb. 2012 pp. 1-5.

Leong, D. et al., "Erasure Coding for Real-Time Streaming" Jul. 2012, pp. 1-5.

Leong, D. et al., "On Coding for Real-Time Streaming under Packet Erasures" *IEEE International Symposium on Information Theory* (2013), pp. 1-5.

International Search Report mailed on Sep. 12, 2014 for international application PCT/US2014/026689 filed on Mar. 13, 2014 in the name of California Institute of Technology.

Written Opinion mailed on Sep. 12, 2014 for international application PCT/US2014/026689 filed on Mar. 13, 2014 in the name of California Institute of Technology.

\* cited by examiner

Table I

| Budget $T$ | Optimal allocation $(x_1, x_2, x_3)$ |
|---|---|
| $1 \leq T < \frac{3}{2}$ | $(1,0,0)$ |
| $\frac{3}{2} \leq T < 2$ | $(1,0,0)$ if $-p_1 + p_1p_2 + p_1p_3 + p_2p_3 - 2p_1p_2p_3 \leq 0$ <br> $(\frac{1}{2}, \frac{1}{2}, \frac{1}{2})$ if $-p_1 + p_1p_2 + p_1p_3 + p_2p_3 - 2p_1p_2p_3 \geq 0$ |
| $2 \leq T < 3$ | $(1,1,0)$ |

Fig. 2

Table II

| Budget T | Optimal allocation $(x_1, x_2, x_3, x_4)$ | |
|---|---|---|
| $1 \leq T < \frac{4}{3}$ | $(1, 0, 0, 0)$ | |
| $\frac{4}{3} \leq T < \frac{3}{2}$ | $(1, 0, 0, 0)$ | if $-p_1 + p_1p_2p_3 + p_1p_2p_4 + p_1p_3p_4 + p_2p_3p_4 - 3p_1p_2p_3p_4 \leq 0$ |
| | $\left(\frac{1}{3}, \frac{1}{3}, \frac{1}{3}, \frac{1}{3}\right)$ | if $-p_1 + p_1p_2p_3 + p_1p_2p_4 + p_1p_3p_4 + p_2p_3p_4 - 3p_1p_2p_3p_4 \geq 0$ |
| $\frac{3}{2} \leq T < \frac{5}{3}$ | $(1, 0, 0, 0)$ | if $-p_1 + p_1p_2 + p_1p_3 + p_2p_3 - 2p_1p_2p_3 \leq 0$ |
| | $\left(\frac{1}{2}, \frac{1}{2}, \frac{1}{2}, 0\right)$ | if $-p_1 + p_1p_2 + p_1p_3 + p_2p_3 - 2p_1p_2p_3 \geq 0$ |
| $\frac{5}{3} \leq T < 2$ | $(1, 0, 0, 0)$ | if $-p_1 + p_1p_2 + p_1p_3 + p_2p_3 - 2p_1p_2p_3 \leq 0$ <br> and $-p_1 + p_1p_2 + p_1p_3 - p_1p_2p_3 + p_1p_4 - p_1p_2p_4 - p_1p_3p_4 + p_2p_3p_4 \leq 0$ |
| | $\left(\frac{1}{2}, \frac{1}{2}, \frac{1}{2}, 0\right)$ | if $-p_1 + p_1p_2 + p_1p_3 + p_2p_3 - 2p_1p_2p_3 \geq 0$ <br> and $-p_2p_3 + p_1p_2p_3 + p_1p_4 - p_1p_2p_4 - p_1p_3p_4 + p_2p_3p_4 \leq 0$ |
| | $\left(\frac{2}{3}, \frac{1}{3}, \frac{1}{3}, \frac{1}{3}\right)$ | if $-p_1 + p_1p_2 + p_1p_3 - p_1p_2p_3 + p_1p_4 - p_1p_2p_4 - p_1p_3p_4 + p_2p_3p_4 \geq 0$ <br> and $-p_2p_3 + p_1p_2p_3 + p_1p_4 - p_1p_2p_4 - p_1p_3p_4 + p_2p_3p_4 \geq 0$ |
| $2 \leq T < \frac{5}{2}$ | $(1, 1, 0, 0)$ | if $-p_1 - p_2 + 2p_1p_2 + p_1p_3 + p_2p_3 - 2p_1p_2p_3 + p_1p_4 + p_2p_4$ <br> $-2p_1p_2p_4 + p_3p_4 - 2p_1p_3p_4 - 2p_2p_3p_4 + 3p_1p_2p_3p_4 \leq 0$ |
| | $\left(\frac{1}{2}, \frac{1}{2}, \frac{1}{2}, \frac{1}{2}\right)$ | if $(p_2p_3 + p_2p_4 + p_3p_4 - 2p_2p_3p_4)(1 - p1) + p_1 \leq p_1 + p_2 - p_1p_2$ |
| $\frac{5}{2} \leq T < 3$ | $(1, 1, 0, 0)$ | if $p_2p_3 + p_2p_4 + p_3p_4 - 2p_2p_3p_4 + p_1 - p1p2 \geq p_1 + p_2 - p_1p_2$ |
| | $\left(1, \frac{1}{2}, \frac{1}{2}, \frac{1}{2}\right)$ | if $-p_2 + p_2p_3 + p_2p_4 + p_3p_4 - 2p_2p_3p_4 \geq 0$ |
| $3 \leq T < 4$ | $(1, 1, 1, 0)$ | |

Fig. 3

Algorithm 1 (One-Level Symmetric Allocation)

121: for each subset size choice $m = 1, \ldots, n$ do
122:     for each $M = \lceil \frac{m}{T} \rceil, \ldots, m$ do
123:         Compute the probability of accessing exactly $M$ out of the $m$ nonempty nodes:
$$P_M = \sum_{r \in \mathcal{P}(\{\binom{m}{M}\})} \left(\prod_{k \in r} p_k\right) \left(\prod_{l \notin r}(1 - p_l)\right).$$
124:     end for
125:     Compute the success probability for subset size $m$:
$$P_{\text{succ},m} = \sum_{M=\lceil \frac{m}{T} \rceil}^{m} P_M.$$
126: end for
127: Obtain the optimal subset size choice $m$ with the largest $P_{\text{succ},m}$.

Fig. 4

Algorithm 2 (Simplified Version of Algorithm 1)

131: for each subset size choice $m = \lfloor T \rfloor, \ldots, \lfloor K_{\max}T \rfloor$ do
132:    Compute the average access probability for the $m$ nodes: $p_{\text{avg}} = \frac{\sum_{i=1}^{m} p_i}{m}$.
133:    for each $M = \lceil \frac{m}{T} \rceil, \ldots, m$ do
134:       Compute $P'_M = \binom{m}{M} \cdot p_{\text{avg}}^M \cdot (1 - p_{\text{avg}})^{(m-M)}$.
135:    end for
136:    Compute the success probability for subset size $m$: $P_{\text{succ},m} = \sum_{M=\lceil \frac{m}{T} \rceil}^{m} P'_M$.
137: end for
138: Obtain the optimal subset size choice $mOpt$ with the largest $P_{\text{succ},mOpt}$.

Fig. 5

Algorithm 3 (Two-Level Symmetric Allocation)

1401: for each subset size choice $m_1 = 1, \ldots, mOpt_{oneLevel}$ do

1402:     Compute the average access probability of the $m_1$ nodes in the 1st level: $p_{avg,1} = \frac{\sum_{i=1}^{m_1} p_i}{m_1}$.

1403:     for each subset size choice $m_2 = \lfloor K_{min}T - 2m_1 \rfloor, \lfloor (K_{min}+1)T - 2m_1 \rfloor, \ldots, \lfloor K_{max}T - 2m_1 \rfloor$ do

1404:         Compute the average access probability of the $m_2$ nodes in the 2nd level: $p_{avg,2} = \frac{\sum_{i=m_1+1}^{m_1+m_2} p_i}{m_2}$.

1405:         Compute the set $\mathcal{M}_{m_1,m_2}$ of all pairs $(m_{acc,1}, m_{acc,2})$ that allow successful recovery, as given by (6).

1406:         Compute the success probability corresponding to the current choice of $(m_1, m_2)$:

$$P_{succ,m_1,m_2} = \sum_{(m_{acc,1}, m_{acc,2}) \in \mathcal{M}_{m_1,m_2}} P_{acc,1} \cdot P_{acc,2},$$

where $$P_{acc,1} = \binom{m_1}{m_{acc,1}} \cdot p_{avg,1}^{m_{acc,1}} \cdot (1 - p_{avg,1})^{(m_1 - m_{acc,1})},$$

$$P_{acc,2} = \binom{m_2}{m_{acc,2}} \cdot p_{avg,2}^{m_{acc,2}} \cdot (1 - p_{avg,2})^{(m_2 - m_{acc,2})}.$$

1407:         Compare $P_{succ,m_1,m_2}$ with the current optimal $P_{succ,mOpt_1,mOpt_2}$.

1408:         if $P_{succ,m_1,m_2} > P_{succ,mOpt_1,mOpt_2}$ then

1409:             Set $P_{succ,mOpt_1,mOpt_2} = P_{succ,m_1,m_2}$.

1410:             Set $mOpt_1 = m_1$, and $mOpt_2 = m_2$.

1411:         end if

1412:         If $mOpt_2$ keeps the same value for $D = \frac{2(n-m_1)}{3}$ steps, then we consider this value of $mOpt_2$ to be the best choice of $m_2$ for the current choice of $m_1$, and continue to the next value of $m_1$.

1413:     end for

1414: end for

1415: Obtain the optimal choice of $(mOpt_1, mOpt_2)$ with the largest value of $P_{succ,mOpt_1,mOpt_2}$.

Fig. 6

Algorithm 4 (Three-Level Symmetric Allocation)

1501: for each subset size choice $m_1 = 1, \ldots, mOpt_{1,\text{twoLevel}} + mOpt_{2,\text{twoLevel}}$ do

1502:     Compute the average access probability of the $m_1$ nodes in the 1st level: $p_{\text{avg},1} = \frac{\sum_{i=1}^{m_1} p_i}{m_1}$.

1503:     for each subset size choice $m_2 = 1, \ldots, n - m_1 - 1$ do

1504:         Compute the average access probability of the $m_2$ nodes in the 2nd level: $p_{\text{avg},2} = \frac{\sum_{i=m_1+1}^{m_1+m_2} p_i}{m_2}$.

1505:         for each subset size choice $m_3 = \lfloor K_{\min}T - 3m_1 - 2m_2 \rfloor, \lfloor (K_{\min}+1)T - 3m_1 - 2m_2 \rfloor, \ldots, \lfloor K_{\max}T - 3m_1 - 2m_2 \rfloor$ do

1506:             Compute the average access probability of the $m_3$ nodes in the 3rd level: $p_{\text{avg},3} = \frac{\sum_{i=m_1+m_2+1}^{m_1+m_2+m_3} p_i}{m_3}$.

1507:             Compute the set $\mathcal{M}_{m_1,m_2,m_3}$ of all triples $(m_{\text{acc},1}, m_{\text{acc},2}, m_{\text{acc},3})$ that allow successful recovery, as given by (7).

1508:             Compute the success probability corresponding to the current choice of $(m_1, m_2, m_3)$:

$$P_{\text{succ},m_1,m_2,m_3} = \sum_{(m_{\text{acc},1},m_{\text{acc},2},m_{\text{acc},3}) \in \mathcal{M}_{m_1,m_2,m_3}} P_{\text{acc},1} \cdot P_{\text{acc},2} \cdot P_{\text{acc},3},$$

where $$P_{\text{acc},L} = \binom{m_L}{m_{\text{acc},L}} \cdot p_{\text{avg},L}^{m_{\text{acc},L}} \cdot (1 - p_{\text{avg},L})^{(m_L - m_{\text{acc},L})}$$

for $L \in \{1, 2, 3\}$.

1509:             Compare $P_{\text{succ},m_1,m_2,m_3}$ with the current optimal $P_{\text{succ},mOpt_1,mOpt_2,mOpt_3}$.

1510:             if $P_{\text{succ},m_1,m_2,m_3} > P_{\text{succ},mOpt_1,mOpt_2,mOpt_3}$ then

1511:                 Set $P_{\text{succ},mOpt_1,mOpt_2,mOpt_3} = P_{\text{succ},m_1,m_2,m_3}$.

1512:                 Set $mOpt_1 = m_1$, $mOpt_2 = m_2$, and $mOpt_3 = m_3$.

1513:             end if

1514:             If $mOpt_3$ keeps the same value for $D = \frac{2(n-m_1-m_2)}{3}$ steps, then we consider this value of $mOpt_3$ to be the best choice of $m_3$ for the current choice of $(m_1, m_2)$, and continue to the next value of $m_2$.

1515:         end for

1516:         ...

1517:     end for

1518: end for

1519: Obtain the optimal choice of $(mOpt_1, mOpt_2, mOpt_3)$ with the largest value of $P_{\text{succ},mOpt_1,mOpt_2,mOpt_3}$.

Fig. 7

DISTRIBUTED STORAGE ALLOCATION FOR HETEROGENEOUS SYSTEMS

CROSS REFERENCE TO RELATED APPLICATIONS

The present application claims priority to U.S. provisional Patent Application Ser. No. 61/784,282, filed on Mar. 14, 2013, for "Distributed Storage Allocation for Heterogeneous Systems", which is herein incorporated by reference in its entirety.

STATEMENT OF GOVERNMENT GRANT

This invention was made with government support under FA9550-10-10166 awarded by Air Force. The government has certain rights in the invention.

BACKGROUND

Technical Field

The present disclosure relates to methods and algorithms related to the field of network communication and distributed network architectures as used, for instance, in content delivery or wireless communication. In particular, the present disclosure presents novel distributed storage allocation techniques which can be used, for example, for communicating over a network comprising distributed storage with storage nodes having heterogeneous access probabilities. The goal is to store, over the distributed storage, a given data object (e.g. a file) with the maximum probability of successful recovery. The data object can be split and coded across multiple storage nodes. Assuming the use of an appropriate code (e.g., maximum distance separable (MDS) code, random linear code), the original data object can be recovered if the total amount of data accessed is at least the size of the original data object.

SUMMARY

According to the various embodiments of the present disclosure, the various storage nodes in the distributed storage system can be arranged in descending order of their access probabilities (e.g., the node with the highest failure probability is last). A novel approach based on of symmetric allocations of one or more levels are presented in the present disclosure. In a basic one-level symmetric allocation, the entire storage budget is spread evenly over the first m nodes, where the value of m is determined, for example, based on the failure probabilities. In a two-level symmetric allocation, the budget is divided into two parts, one spread evenly over the first $m_1$ nodes, and the other spread evenly over the subsequent $m_2$ nodes, such that the amount allocated to each node in the first subset is twice that in the second subset. A k-level symmetric allocation, derived from the two-layer allocation where k=2, is also presented. According to the various embodiments of the present disclosure, efficient algorithms for finding good one-level, two-level, and k-level symmetric allocations given the access probabilities are provided.

Despite their low complexity, the one-level, two-level and k-level symmetric allocations according to the present disclosure can outperform existing methods which are based on large deviation inequalities and convex optimization, under the same parameter settings in numerical experiments, as presented by the various graphs of the present disclosure.

Furthermore, the novel two-level and k-level symmetric allocation according to the present disclosure can achieve a higher recovery probability than the novel one-level symmetric allocation. Moreover and according to the present disclosure, for small numbers of nodes (e.g. $n \leq 4$), the exact optimal allocation, which can be determined exhaustively, can be found among the one-level and two-level symmetric allocations.

In addition to distributed storage, the above approach can also be applied to other problems, such as for example, to the problem of code design for real-time streaming, where messages can arrive sequentially at a source (e.g. computer-based workstation) and are encoded at the source for transmission over a packet erasure channel to a sink (e.g. computer-based workstation), which needs to decode the messages sequentially within a specified delay. In various network scenarios, packet delay (e.g. as received by the sync node) can exhibit variation, causing the probability of packet reception to increase with delay. By viewing transmitted packets in the real-time streaming problem as nodes in the storage allocation problem, with the corresponding heterogeneous delay-dependent loss probabilities, solutions for the heterogeneous storage allocation problem translate into intra-session codes for the corresponding streaming problem.

According to a first aspect of the present disclosure, a computer-based method for allocating storage in a heterogeneous storage system is presented, the computer-based method comprising: providing a set of hardware storage nodes of known heterogeneous reliabilities; providing, via a computer, an objective function; providing, via a computer, a constraint; based on the constraint and the objective function, selecting, via a computer, one or more disjoint subsets of the set of hardware storage nodes; and based on the selecting, allocating, via a computer, a storage amount to the one or more disjoint subsets, wherein the allocating is based on the heterogeneous reliabilities and the constraint, and is obtained by spreading the storage amount over the one or more disjoint subsets such that each hardware storage node of each subset of the one or more disjoint subsets have a same amount of allocated storage different from an amount allocated to a hardware storage node of a different subset.

According to second aspect of the present disclosure a computer-based system for distributed storage allocation is presented, the computer-based system comprising: a computer-based source configured to communicate over one or more communication links with a plurality of hardware-based storage nodes of known heterogeneous reliabilities, wherein the computer-based source is configured to execute a storage allocation algorithm to obtain an allocated storage over the plurality of hardware-based storage nodes, the algorithm performing the tasks of: i) based on a provided budget and a provided objective function, select one or more disjoint subsets of the plurality of hardware-based storage nodes, wherein the budget specifies a portion of a total available storage size of the plurality of hardware-based storage nodes; ii) and allocate the budget to the one or more disjoint subsets by spreading the budget over the one or more disjoint subsets such that each hardware-based storage node of each subset of the one or more disjoint subsets have a same amount of allocated budget different from an amount allocated to a hardware-based storage node of a different subset, wherein the allocation of the budget is based on the heterogeneous reliabilities and the budget.

According to third aspect of the present disclosure, a computer-based method for real-time streaming of a plurality of independent messages over a communication link is presented, the computer-based method comprising the steps: i) providing via a computer, a message size s of the plurality of independent messages; ii) providing via a computer, a message creation interval c based on a number of time steps, wherein the message creation interval defines the time interval between creation times of two consecutive messages; iii) providing via a computer, a constraint specifying a budget, wherein the budget corresponds to a maximum size of an encoded packet transmitted at each time step; iv) providing via a computer, a fixed decoding delay d in number of time steps, wherein the fixed decoding delay defines a delay with respect to a creation time of a message from the plurality of independent messages within which the message must be decoded, via a computer-based decoder, based on one or more transmitted packets; v) providing via a computer, a heterogeneous reliability model defining a heterogeneous delay-dependent loss probability of a transmitted packet over the communication link; vi) encoding, via a computer, a message of the plurality of independent messages; and vii) based on the steps i)-vi), generating via a computer, a plurality of packets in correspondence of the encoded message, and transmitting the plurality of packets sequentially over the communication link, wherein: a message of the plurality of independent messages created at a time step i is allocated portions of space in packets transmitted at time steps i, i+1, . . . , i+d chosen according to the heterogeneous reliability model; the message is coded across the allocated portions of the space in packets at time steps i, i+1, . . . , i+d using an erasure correcting code; and the message is decoded by a computer-based decoder within the fixed decoding delay from a creation time of the message.

BRIEF DESCRIPTION OF THE DRAWINGS

FIG. 2 shows an optimal allocation Table I for a system comprising 3 heterogeneous nodes (n=3) with $p_1 \geq p_2 \geq p_3$.

FIG. 3 shows an optimal allocation Table II for a system comprising 4 heterogeneous nodes (n=4) with $p_1 \geq p_2 \geq p_3 \geq p_4$.

FIG. 4 shows performance of the one-level and two-level symmetric allocations obtained by Algorithms 1 and 3 of the present disclosure respectively, compared with the exact optimal solution, for n=4 and $(p_1, p_2, p_3, p_4)$=(0.8479, 0.6907, 0.6904, 0.6725).

FIG. 5 shows various graphs representing performance of the proposed algorithms according to the present disclosure and prior art algorithms in terms of the probability of failed recovery for n=30.

FIG. 6, shows various graphs representing amount of distribution per node for different methods when the total budget T=2, and n=30.

FIG. 7 shows various graphs representing performance of the proposed algorithms in terms of the probability of failed recovery for the case where n=50.

DETAILED DESCRIPTION

Introduction

Figure 1:
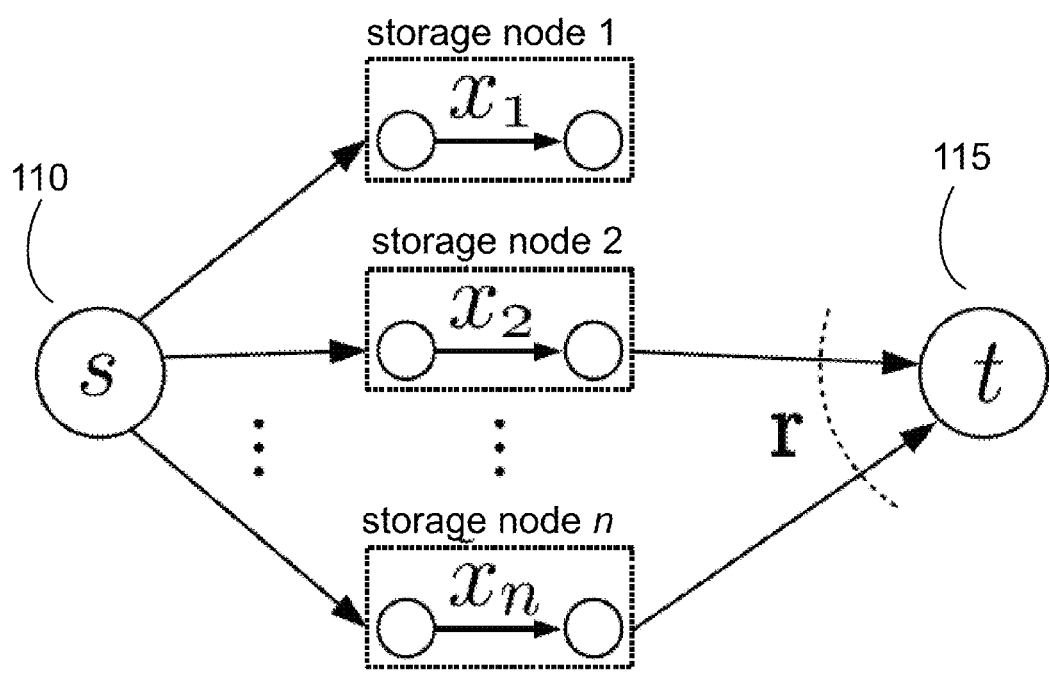
FIG. 1 shows information flow in an exemplary distributed storage system. The source s has a single data object of normalized unit size that is to be coded and stored over n storage nodes. Subsequently, a data collector t attempts to recover the original data object by accessing only the data stored in a random subset r of the nodes.

The various aspects according to the present disclosure consider the problem of storing a data object (e.g. a file, a video stream, a cellular voice message, etc. . . . ) over a set of storage nodes (e.g. with hardware dependencies) with heterogeneous access probabilities, so as to maximize the probability of successful recovery for a given total storage budget. The data object can be split and coded across multiple storage nodes. By employing, for example, a maximum distance separable (MDS) code, the original data object can be recovered if the total amount of data accessed is at least the size of the data object. The goal is to determine the optimal allocation of the storage budget across the set of storage nodes such that a subsequent recovery probability is maximized.

The problem of storage allocation is motivated by practical storage problems, for instance, in peer-to-peer cloud storage with heterogeneous nodes, content delivery networks, delay tolerant networks and wireless sensor networks. For example, each node can be a virtual private server (VPS) for which uptime/downtime statistics are known and can therefore be used as a measure for a corresponding access probability. In another example, a hard disk rack used for storing data for a server can comprise storage hardware (e.g. hard disks) with varying degrees of reliability, as measured for example, per the age of a given storage hardware and/or a corresponding manufacturer's reliability data (e.g. mean time before failure MTBF), which can also be used as basis for modeling an equivalent distributed storage with heterogeneous storage to which the various solutions provided in the present disclosure can be applied.

Storage allocation is a complex combinatorial optimization problem even in the special case where the nodes have homogeneous (e.g. same) access probability, as there is a large space of feasible allocations and computing the recovery probability of a given allocation is #P-hard [1]. Variations of this problem have been studied in several different fields including P2P networking [2], wireless communication [3] [4] and reliability engineering [5]. For the heterogeneous case where nodes have different access probabilities, Ntranos et al. [6] proposed algorithms based on large deviation inequalities and convex optimization.

A (basic) symmetric allocation, as provided by the various embodiments of the present disclosure, spreads the budget over an appropriately chosen subset of nodes, and can be constructed efficiently, such as for example be computational inexpensive, and can also outperform the existing methods in [6]. According to further embodiments of the present disclosure, the basic symmetric allocation and corresponding construction algorithm can be expanded to a multi k-level symmetric allocation, in which the total budget is divided into k parts, each spread evenly over a different subset of nodes, such that the amount allocated to each node in a higher level is multiple times that of a last level. In other words, the amount per node in the last level serves as a unit amount.

Performance analysis for a given number of nodes of the novel two-level and three-level symmetric allocations as per the present disclosure are provided in the ensuing sections of the disclosure. For small numbers of nodes n≤4, the exact optimal allocation, which can be determined exhaustively (e.g. exhaustive computing), can be found among the one-level and two-level symmetric allocations (e.g. as given in Tables I and II). For larger numbers of nodes, these symmetric allocations as provided by the various embodiments of the present disclosure can outperform existing non-symmetric allocations. Moreover, their performance can be further improved by increasing the number of associated levels and therefore the flexibility of the symmetric allocation. As presented in ensuing sections of the present disclosure, the various techniques for symmetric allocations can be applied to the design of streaming codes.

Problem Description

It is assumed that the original data object is normalized to unit size. The data object can be stored, with appropriate coding, over n heterogeneous nodes (1, 2, . . . n) as depicted in FIG. 1, where a source node S (110) feeds the data object to the n nodes via n links (105). Each node i stores $x_i$ amount of coded data, subject to a given total storage budget T. The constraint on the storage budget can be associated to, for example, a limited transmission bandwidth and/or a limited storage space, or even to a constraint on storage cost as it may be too costly to mirror the data object in its entirety in each node. At the time of data retrieval, a data collector (115) accesses each node independently with probability $p_i$, where $0 < p_i < 1$. Let r denote the random subset of nodes accessed by the data collector, where the probability of distribution of r can be specified by, for example, an access model and/or a failure model (e.g. nodes or links may fail probabilistically). The general version of this optimization problem can be stated by an objective function maximizing recovery and a constraint imposing a limit to the available storage as provided by the following expression (1):

$$\left. \begin{array}{l} \max_{x_1, \ldots, x_n} \sum_{r \in \mathcal{P}(\{1, \ldots, n\})} \left( \prod_{i \in r} p_i \right) \left( \prod_{i \notin r} 1 - p_i \right) \cdot 1\left[ \sum_{i \in r} x_i \geq 1 \right] \\ \text{subject to:} \\ \sum_{i=1}^{n} x_i \leq T \\ x_i \geq 0 \; \forall \, i \in \{1, \ldots, n\} \end{array} \right\} \quad (1)$$

where 1 [.] represents the indicator function, also known as the characteristic function. Each node is available with a probability $p_i$, and the resulting set of available nodes r (e.g. nodes that can be accessed), is random and of random size. The objective function in the expression (1) can be considered as the recovery (or access) probability, expressed as the sum of the probabilities corresponding to the subset r that allow a successful recovery of the data object given the restriction (e.g. constraint) imposed by a budget function which in this case is a fixed function defining the total budget T. In other words, the optimization problem expressed in (1) attempts to maximize the reliability of the system given a certain imposed restriction on the available storage budget. The various teachings according to the present disclosure and as presented in the following sections provide solutions to such optimization problem; optimize how much storage to put (allocate) in different nodes with different reliabilities in such a way the overall reliability of the system comprising these nodes is maximized. Such solutions are also provided in flowcharts representing step by step algorithms to obtain an optimized solution. The person skilled in the art is well familiar with such formulation of an optimization problem and corresponding methods. Although the constraint considered in the optimization problem (1) is fixed, the person skilled in the art will know how to modify such constraint to better fit a set of imposed requirements and still use the teachings according to the various presented embodiments to obtain an optimized allocation. For example, one may be interested in minimizing the cost associated with the budget (storage), so the more storage is used, the more costly the system. In such case, the constraint can become a cost (objective) function and the reliability objective can become a reliability constraint for which the optimization problem will be solved. In other words, according to a desired objective, the afore-mentioned objective function and constraint can be interchanged. Alternatively, the objective function can be a weighted function of cost and reliability.

For brevity, it is assumed that T<n, since for T≥n the optimal allocation is the trivial one: $\{1, \ldots, 1\}$, where each node stores one copy of the original data object. Furthermore, it can be assumed that $x_i \leq 1$ since it is not helpful for a node to store more than one copy of the data.

While the optimization problem defined by (1) is computationally intractable for large n, it is possible to determine the optimal allocation for small n by exhaustive search over all feasible combinations of subsets (e.g. of the nodes). The list of the optimal allocations obtained via exhaustive search for different scenarios is provided in Tables I and II of FIGS. 2 and 3 respectively. Table I shows the optimal allocations for n=3 with $p_1 \geq p_2 \geq p_3$ and Table II shows optimal allocations for n=4 with $p_1 \geq p_2 \geq p_3 \geq p_4$.

One-Level Symmetric Allocation

According to an embodiment of the present disclosure, a basic one-level symmetric allocation is obtained by spreading the total budget T evenly over a subset of nodes. Using nodes with higher probability increases the reliability of the system. Therefore the nodes can be ordered with access probabilities in descending order such that $p_1 \geq p_2 \geq \ldots \geq p_n$, and the optimization problem provided by (1) reduces to choosing the subset size m, corresponding to the allocation:

$$\left\{ x_1 = \frac{T}{m}, \ldots, x_m = \frac{T}{m}, x_{m+1} = 0, \ldots, x_n = 0 \right\}$$

Successful recovery requires accessing at least $$\left\lceil \frac{m}{T} \right\rceil$$

of the m nonempty nodes. The probability of accessing M nonempty nodes is:

$$P_M = \sum_{r \in \mathcal{P}\left(\left\{\binom{m}{M}\right\}\right)} \left(\prod_{k \in r} p_k\right)\left(\prod_{l \notin r} (1 - p_l)\right) \quad (2)$$

Where $\mathcal{P}(\{(M^m)\})$ denotes the set of size-M subsets of $\{1, \ldots, m\}$.

Thus, the probability of successful recovery is given by the expression (3):

$$P_{successful} = \sum_{M=\lceil \frac{m}{T} \rceil}^{m} P_M \quad (3)$$

$$= \sum_{M=\lceil \frac{m}{T} \rceil}^{m} \sum_{r \in \mathcal{P}\left(\left\{\binom{m}{M}\right\}\right)} \left(\prod_{k \in r} p_k\right)\left(\prod_{l \notin r} (1 - p_l)\right)$$

According to an embodiment of the present disclosure, Algorithm 1, as presented in FIG. 4, finds an optimal one-level symmetric allocation by using expressions (2) and (3). The term "level" as used herein can refer to an allocation wherein each of the nodes allocated with a non-zero budget contain a same amount of the total budget.

Instead of considering all possible values of m, an approach similar to one provided in [1, Section II-C] can be considered and therefore restrict the scope of the algorithm to the largest m corresponding to each distinct value of $$\left\lceil \frac{m}{T} \right\rceil,$$

which produces the candidate values $m \in \{\lfloor T \rfloor, \lfloor 2T \rfloor, \ldots, \lfloor K_{max}T \rfloor\}$, where $K_{max}$ is the largest integer K such that $\lfloor KT \rfloor \leq n$. Nonetheless, Algorithm 1 remains computationally intractable for large values of n, as the associated computational complexity grows quickly with respect to values of n.

To further reduce complexity of the Algorithm 1 and according to an embodiment of the present disclosure, each probability $p_i$ can be replaced by the average value of the probabilities $p_i$, given by:

$$p'_i = p_{avg} = \frac{\sum_{i=1}^{m} p_i}{m},$$

and as a result obtaining Algorithm 2, as presented in FIG. 5, which can therefore be considered as a simplified version of Algorithm 1. This simplification (e.g. using $p_{avg}$) can greatly reduce the running time of the algorithm (e.g. corresponding program code executed on a hardware processor) compared to the original Algorithm 1. Numerical experiments, as presented in the ensuing sections of the present disclosure, show that the simplified version, as described in Algorithm 2 of FIG. 5, provides very good performance in spite of its simplicity. The skilled person readily understands that Algorithm 2 (as well as other novel algorithms described in the present disclosure), as described by the corresponding steps (131)-(138) in FIG. 5, is merely an exemplary implementation of the resolving of the various equations and related simplifications as provided in the present section of the disclosure.

Two-Level & Three-Level Symmetric Allocations

Based on observations of the optimal allocations in Tables I and II, noting that some optimal solutions have two levels of amount allocation for a given budget T, the inventors have considered a more general class of two-level symmetric allocations, where each level comprises a disjoint subset of the total available nodes, where the amount allocated to each node in the first level is twice that of the second level:

$$\Big(\underbrace{x_1, \ldots, x_{m_1}}_{\text{level 1}}, \underbrace{x_{m_1+1}, \ldots, x_{m_1+m_2}}_{\text{level 2}}, x_{m_1+m_2+1}, \ldots, x_n\Big), \quad (4)$$

where $$x_1 = \ldots = x_{m_1} = S_1, \quad (5)$$
$$x_{m_1+1} = \ldots = x_{m_1+m_2} = S_2,$$
$$x_{m_1+m_2+1} = \ldots = x_n = 0,$$
$$S_1 = \frac{2T}{2m_1 + m_2},$$
$$S_2 = \frac{T}{2m_1 + m_2}.$$

As the amount of data stored in each node can be expressed as a multiple $S_2$, where $$S_2 = \frac{T}{2m_1 + m_2},$$

$S_2$ can be treated as a quantum or basic storage block. Following the approach of the previous section, the inventors note that successful recovery occurs when at least $$\left\lceil \frac{2m_1 + m_2}{T} \right\rceil$$

out of the $2m_1+m_2$ basic storage blocks are accessed. Let $m_{acc} \in \{0, \ldots, 2m_1 m_2\}$ be the total number of basic storage blocks accessed, and $m_{acc,L} \in \{0, \ldots, m_L\}$ be the number of nodes accessed in level L. Thus, $m_{acc} = 2m_{acc,1} + m_{acc,2}$. It follows that the set $\mathcal{M}_{m_1, m_2}$ of all pairs $(m_{acc,1}, m_{acc,2})$ that allow successful recovery can be expressed by the following expression (6):

$$\mathcal{M}_{m_1,m_2} = \Big\{(m_{acc,1}, m_{acc,2}) : 2m_{acc,1} + m_{acc,2} \geq \left\lceil \frac{2m_1 + m_2}{T} \right\rceil, \quad (6)$$
$$m_{acc,1} \in \{0, \ldots, m_1\},$$
$$m_{acc,2} \in \{0, \ldots, m_2\}. \Big\}$$

At this stage the inventors make the simplifying assumption that mOpt$_1$, the amount of nodes allocated to the first level (e.g. level1) of the two-level symmetric allocation, is less than mOpt$_{oneLevel}$ in the one-level symmetric allocation previously presented. Based on the simplifying assumption and therefore the value mOpt$_{oneLevel}$ obtained in the one-level symmetric allocation algorithm, and according to a further embodiment of the present disclosure, Algorithm 3, as described in FIG. 6, is provided. Algorithm 3 efficiently finds a good two-level symmetric allocation, given by the pair (mOpt$_1$, mOpt$_2$), by computing probabilities in each of the two levels (e.g. level1, level2) approximately in a manner similar to Algorithm 2.

As in the case of the one-level symmetric allocation, Algorithm 3 reduces the search space by considering only certain choices of (m$_1$, m$_2$). Specifically, for a given choice of m$_1$, the algorithm restricts the attention to the largest m$_2$ corresponding to each distinct value of $$\left\lceil \frac{2m_1 + m_2}{T} \right\rceil,$$

which produces the candidate values:

$$m_2 \in \{\lfloor K_{min}T-2m_1 \rfloor, \lfloor (K_{min}+1)T-2m_1 \rfloor, \ldots, \lfloor K_{max}T-2m_1 \rfloor\},$$

where K$_{min}$ is the smallest integer K such that $\lfloor KT-2m_1 \rfloor \geq 0$, and K$_{max}$ is the largest integer K such that $\lfloor KT-2m_1 \rfloor \leq n-m_1$.

According to inventors' observations, the value of mOpt$_2$ rarely changes in many loops, and two different value changes of mOpt$_2$ are usually within a distance D of two-thirds the size of the loop. So in Algorithm 3, when mOpt$_2$ in the inner loop, defined by steps (1402)-(1413) of the algorithm, does not change for two-thirds of the loop size, the algorithm considers this mOpt$_2$ as the best choice in the current loop, and continues to the next loop, which consequently greatly reduces the running time of the algorithm (e.g. as executed within a hardware processor) and still attains almost the same performance. Also it should be noted that D can be set to smaller values, which makes the algorithm run faster but may produce suboptimal solutions.

According to yet another embodiment of the present disclosure, a further generalization of the symmetric allocation that supports three levels is described and presented in an exemplary form in Algorithm 4 of FIG. 7. Let the subset sizes of the three levels be m$_1$, m$_2$, m$_3$, respectively, where the amount per node in the 1st level is 3 times that of the 3rd level, and the amount per node in the 2nd level is 2 times that of the 3rd level. The set $\mathcal{M}_{m_1,m_2,m_3}$ of all triples (m$_{acc,1}$, m$_{acc,2}$, m$_{acc,3}$) that allow successful recovery can be expressed as:

$$\mathcal{M}_{m_1,m_2,m_3} = \{(m_{acc,1}, m_{acc,2}, m_{acc,3}): \quad (7)$$

$$3m_{acc,1} + 2m_{acc,2} + m_{acc,3} \geq \left\lceil \frac{3m_1 + 2m_2 + m_3}{T} \right\rceil,$$
$$m_{acc,1} \in \{0, \ldots, m_1\},$$
$$m_{acc,2} \in \{0, \ldots, m_2\},$$
$$m_{acc,3} \in \{0, \ldots, m_3\}.$$

The inventors make the simplifying assumption that m$_1$ in the three-level symmetric allocation is less than mOpt$_{1,twoLevel}$+mOpt$_{2,twoLevel}$ of the two-level symmetric allocation previously described in the present disclosure.

Based on the simplifying assumption and per an embodiment of the present disclosure, Algorithm 4, as described in FIG. 7, is provided. Algorithm 4 efficiently finds a good three-level symmetric allocation for the optimization problem represented by expression (1).

As in the preceding symmetric allocations presented in the previous section of the disclosure, the search space can be reduced by considering only certain choices of (m$_1$, m$_2$, m$_3$). Specifically, for a given choice of m$_1$ and m$_2$, the inventors restrict the attention to the largest m$_3$ corresponding to each distinct value of $$\left\lceil \frac{3m_1 + 2m_2 + m_3}{T} \right\rceil,$$

which produces the candidate values:

$$m_3 \in \{\lfloor K_{min}T-3m_1-2m_2 \rfloor, \lfloor (K_{min}+1)T-3m_1-2m_2 \rfloor, \ldots, \lfloor K_{max}T-3m_1-2m_2 \rfloor\},$$

where K$_{min}$ is the smallest integer K such that $\lfloor KT-3m_1-2m_2 \rfloor \geq 0$, and K$_{max}$ is the largest integer K such that $\lfloor KT-3m_1-2m_2 \rfloor \leq n-m_1-m_2$. We also set the distance threshold D to be two-thirds the size of the (inner) loop defined by the steps (1503)-(1515) of the algorithm.

The proposed symmetric allocations as per the various embodiments of the present disclosure can be easily generalized to support k levels, where k=4, 5, 6, . . . etc. In such a k-level symmetric allocation, the storage budget T can be allocated so that each nonempty node stores either c, 2c, . . . , or kc amount of data, where c is the size of the corresponding quantum or basic storage block S$_k$ given by where $$S_k = \frac{T}{km_1 + (k-1)m_2 + \ldots + 2m_{k-1} + m_k}.$$

Numerical Experiments

In this section, we evaluate the performance of the above algorithms in terms of probability of failed recovery.

A. Comparison with the Optimal Solution from Table II when n=4

Figure 8:
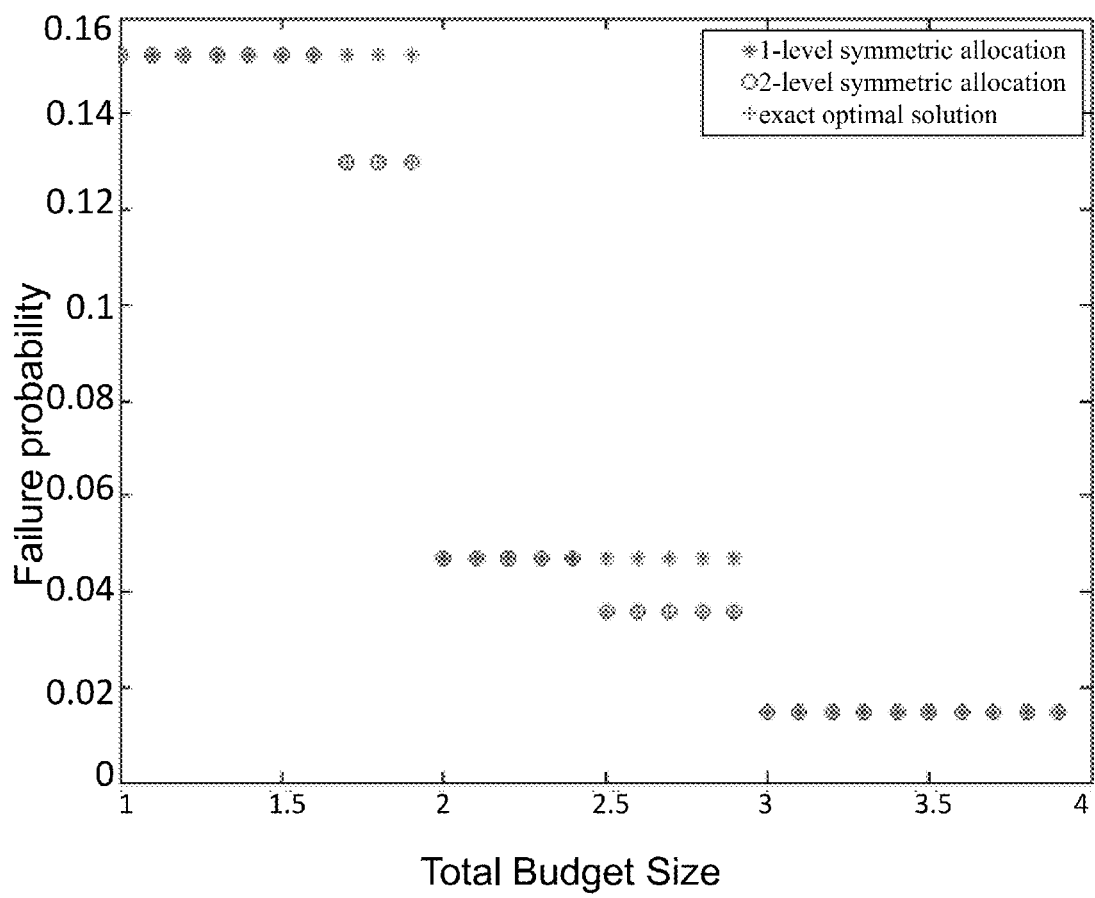
FIG. 8 shows various graphs representing amount of distribution per node for different methods when total budget T=1:7, and n=50.

For n=4, the performance of the one-level and two-level symmetric allocations obtained by Algorithm 1 and Algorithm 3 can be compared, respectively, against the exact optimal allocations obtained from Table II (FIG. 3) which was exhaustively computed. The inventors considered a storage budget range $1 \leq T \leq 4$, and node access probabilities p$_i$, $1 \leq i \leq n$, drawn independently and uniformly at random between 0.5 and 1. FIG. 8 shows the results for a typical instance of the access probabilities. The inventors found that the one-level and two-level symmetric allocations, as per the embodiments of the present disclosure, generally approximate the exact optimal allocations well. The inventors also noted that for certain limited ranges of T, the two-level symmetric allocation is needed for optimality (e.g. m$_1$=1, m$_2$=3 in this case).

B. Comparison with Other Existing Algorithms for Large Values of n

In this section performance comparison for large values of n of Algorithms 2, 3 and 4 against the existing algorithms proposed in [6], namely, Maximal spreading, Chernoff closed-form and Chernoff iterative is provided. Comparison is performed with a budget range $1.2 \leq T \leq 2$, and node access probabilities p$_i$ drawn independently and uniformly at random between 0.5 and 1. Failure probability curves are obtained (and graphed) using numerical Monte Carlo simulation experiments.

Figure 9:
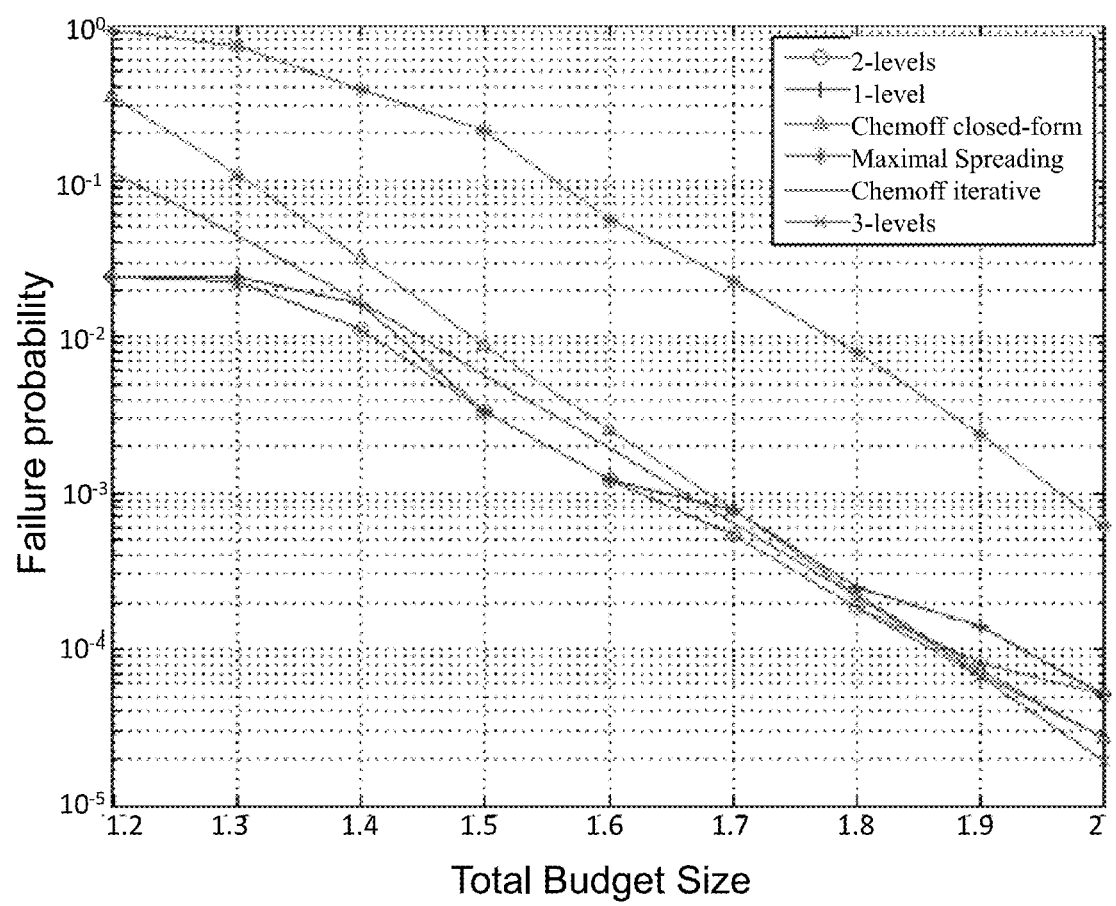
FIG. 9 shows various graphs representing time costs against number of nodes for different algorithms.
Figure 10:
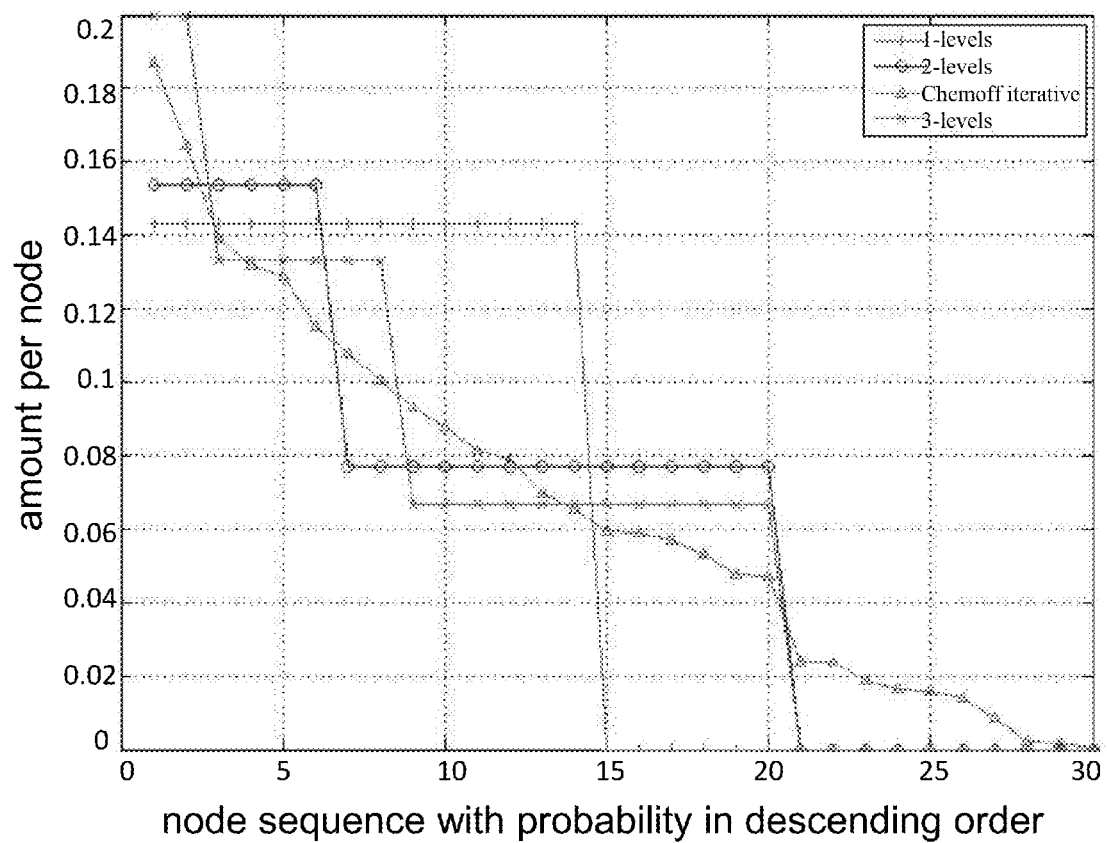
FIG. 10 shows various graphs representing decoding failure probability against packet rate P from 1 to 4 with message rate s=1.
Figure 11:
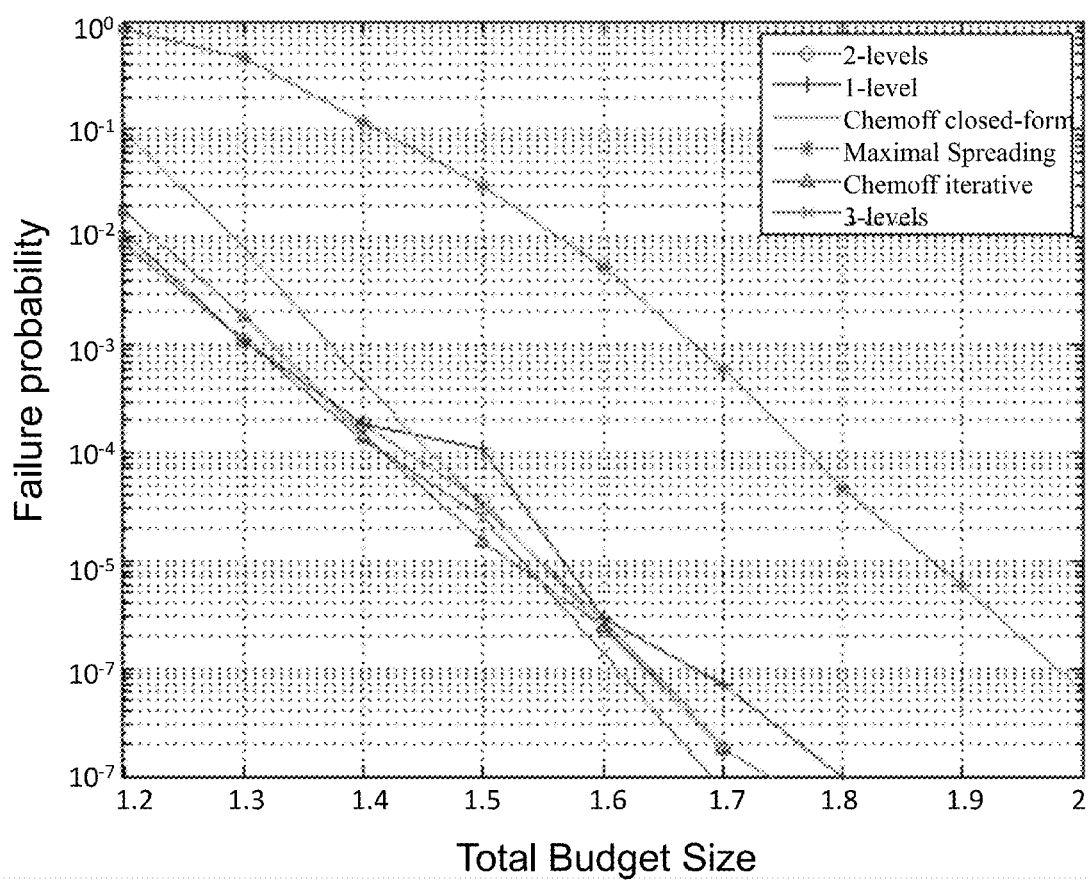
FIG. 11 shows various graphs representing decoding failure probability against message rate s ranging from 0.1 to 1 and packet rate P=1.
Figure 12:
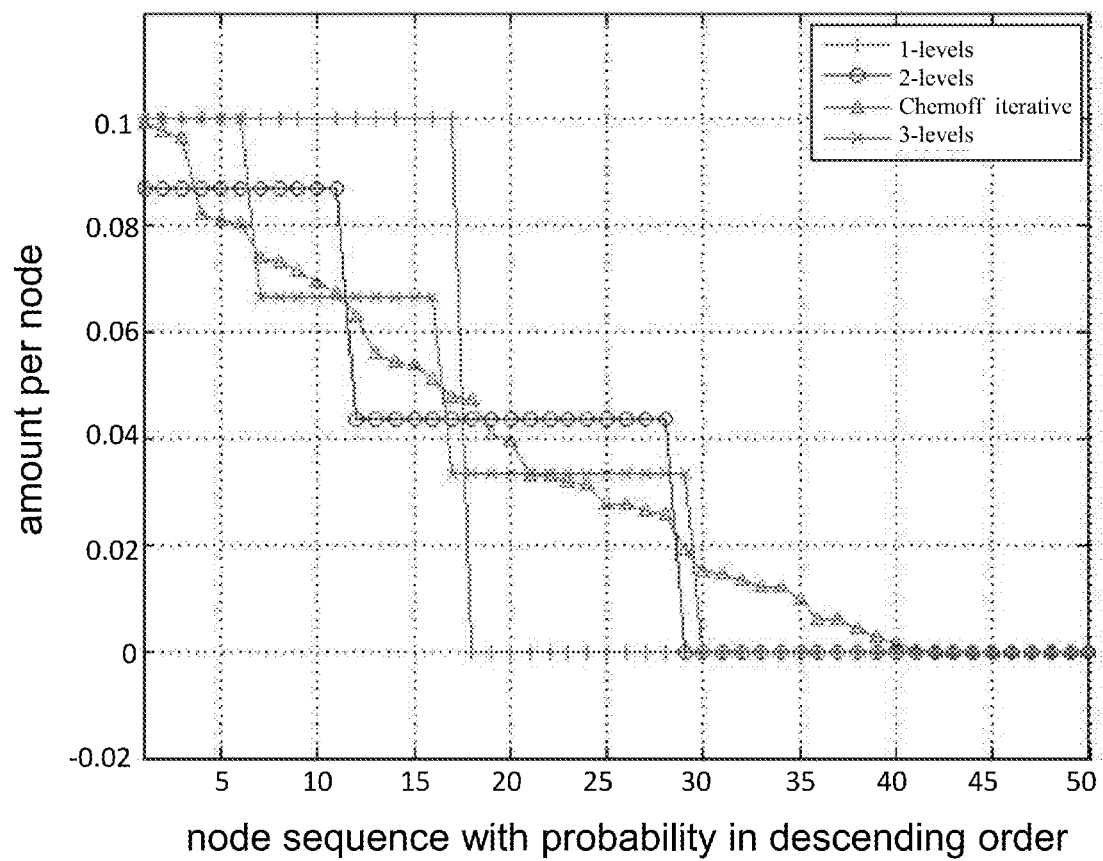
FIG. 12 shows a one-level symmetric allocation algorithm according to an embodiment of the present disclosure.

Results for different problem scales, n=30, 50, are given in FIGS. 9, 10, 11, and 12. In FIGS. 9 and 11, failure probability curves generated by the one-level, two-level, and three-level symmetric allocations, according to the various embodiments of the present disclosure, and the curves generated by the prior art Chernoff-iterative and Chernoff-closed form methods proposed in [6] are graphed. According to these curves, when the budget T is small, the symmetric allocations always outperform the Chernoff methods. When T is large (e.g., T=2 for n=30), even if the Chernoff methods may outperform the one-level and two-level symmetric allocations, there still exists a three-level symmetric allocation that can perform better than the Chernoff methods. Plots representing the amount distribution for different methods for budget T=2 and budget T=1.7 are provided in FIG. 10 and FIG. 12 respectively. These plots suggest that if the symmetric method becomes more flexible and supports more levels, the performance can increase further.

C. Time Costs for Different Methods

Figure 13:
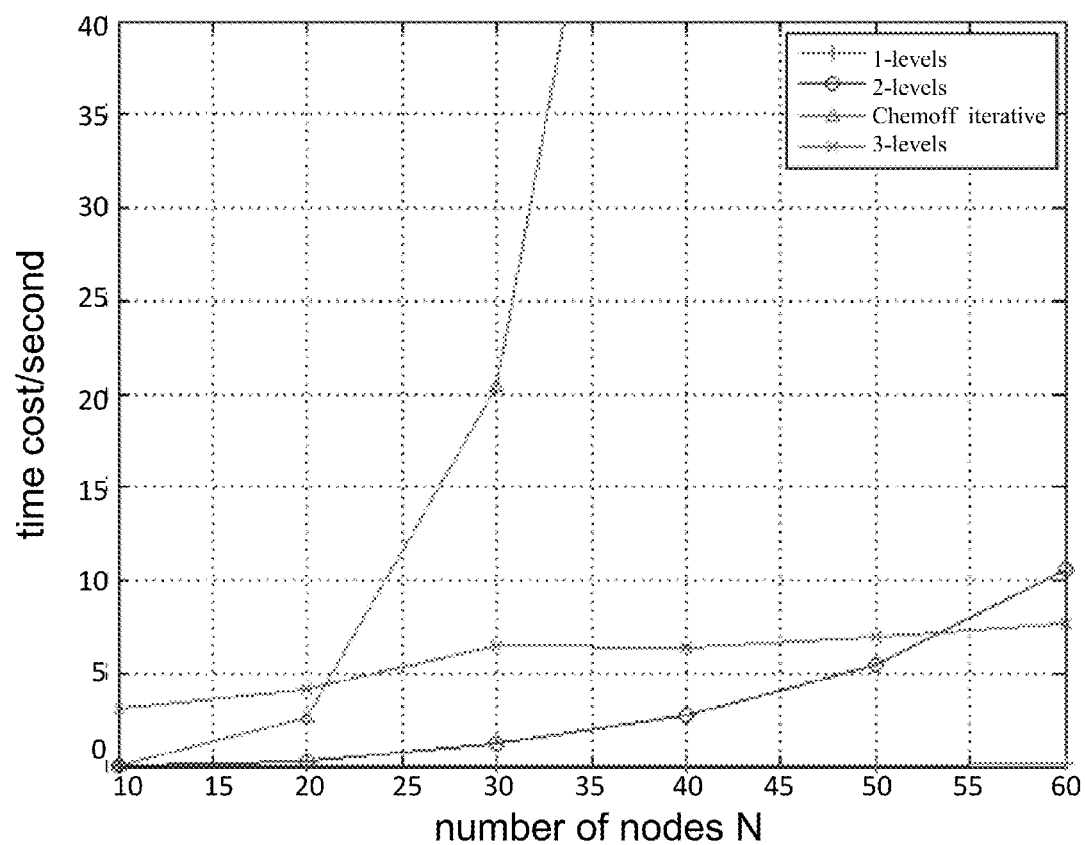
FIG. 13 shows a one-level symmetric allocation algorithm according to an embodiment of the present disclosure which is a simplified version of the algorithm presented in FIG. 12.

FIG. 13 shows the time costs against number of nodes for different algorithms. According to this figure, the one-level symmetric allocation is always faster than the other allocations, and the two-level symmetric allocation is faster than the Chernoff iterative algorithm for n<55. The three-level symmetric allocation is the slowest in most scenarios, which can therefore be used as a compromise for better performance.

D. Algorithm Application: Symmetric Time-Invariant Intra-Session Codes

Figure 16:
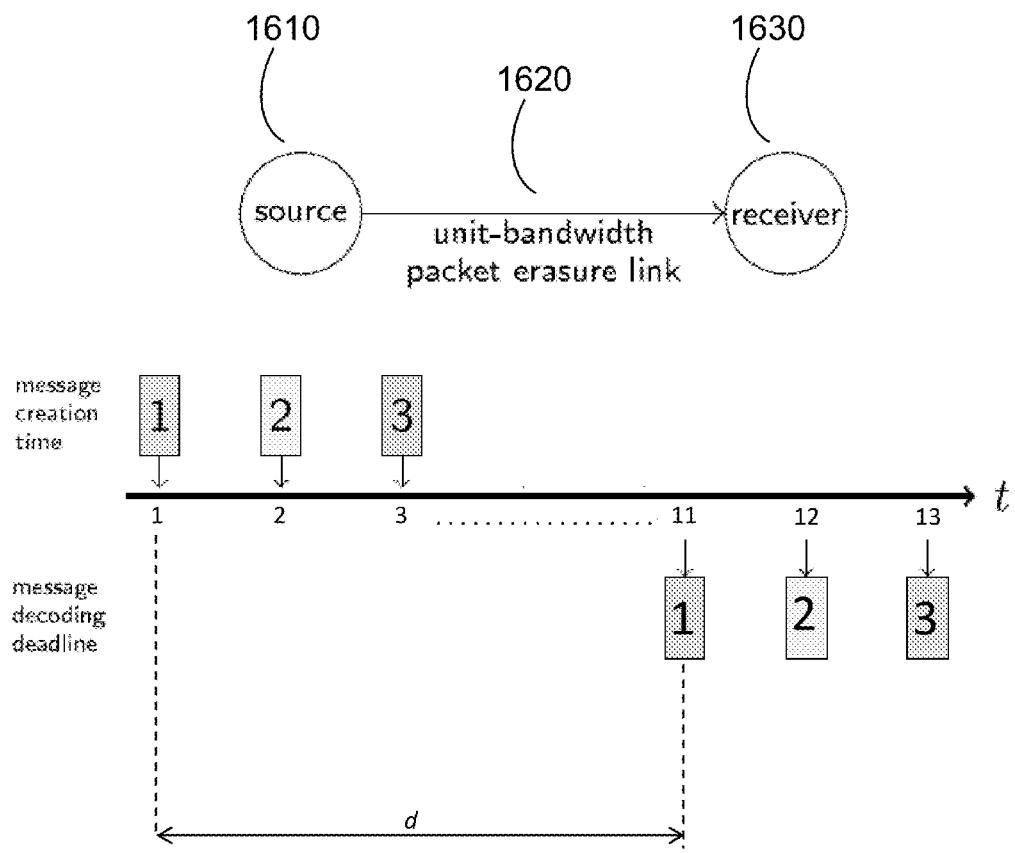
FIG. 16 shows an exemplary real-time streaming system, where messages arrive sequentially at a source and are encoded for transmission over a packet erasure channel to be decoded within a specified delay from their creation time by a sink.

In addition to distributed storage, the symmetric allocation algorithms can also be applied to the problem of code design for real-time streaming [7], [8], an exemplary schematic configuration being provided in FIG. 16, where messages arrive sequentially at a source (1610) and are encoded (e.g. via erasure correcting codes as known in the art) for transmission over a packet erasure channel (1620) to a sink (1630), which needs to decode the messages sequentially within a specified delay. In various network scenarios, packet delay can exhibit variation, causing the probability of packet reception to increase with delay. By viewing transmitted packets between the message creation time and the decoding deadline in the streaming problem as nodes in the storage allocation problem, with the corresponding heterogeneous delay-dependent loss probabilities (e.g. a heterogeneous reliability model), solutions for the heterogeneous storage allocation problem translate into intra-session codes for the corresponding streaming problem, where the storage budget in the storage allocation problem translate to a total available packet size.

As an illustration and with further reference to FIG. 16, let us suppose that independent messages (1, 2, 3 . . . ) of uniform size s>0 are created at the source (1610) at regular intervals of c=1 time step, and must be decoded at the receiver within a delay of d=10 time steps from their respective creation times. We use the delay bound violation probabilities from FIG. 5(*a,b*) in [9] as the different failure probabilities of each packet. The source is allowed to transmit a single data packet of size P>s over the link per time step. Thus, a corresponding virtual budget can be represented by $$= \frac{P}{s}.$$

Figure 14:
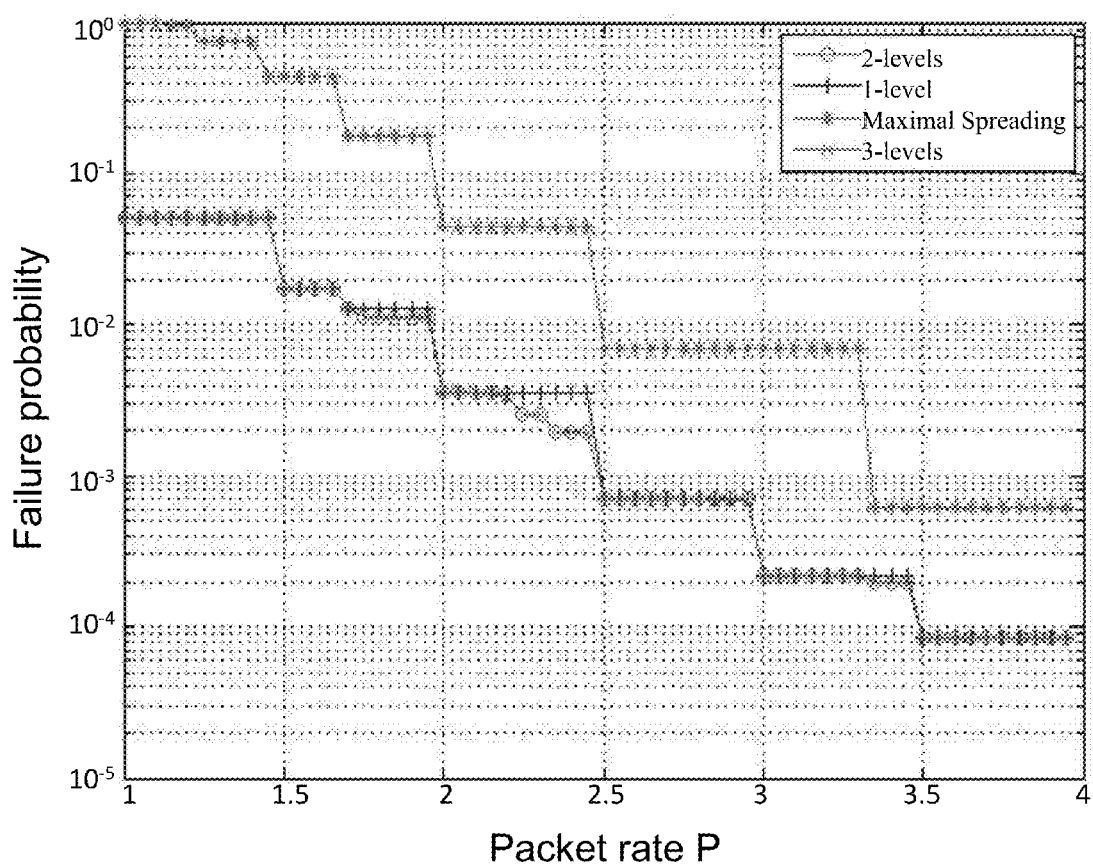
FIG. 14 shows a two-level symmetric allocation algorithm according to an embodiment of the present disclosure.
Figure 15:
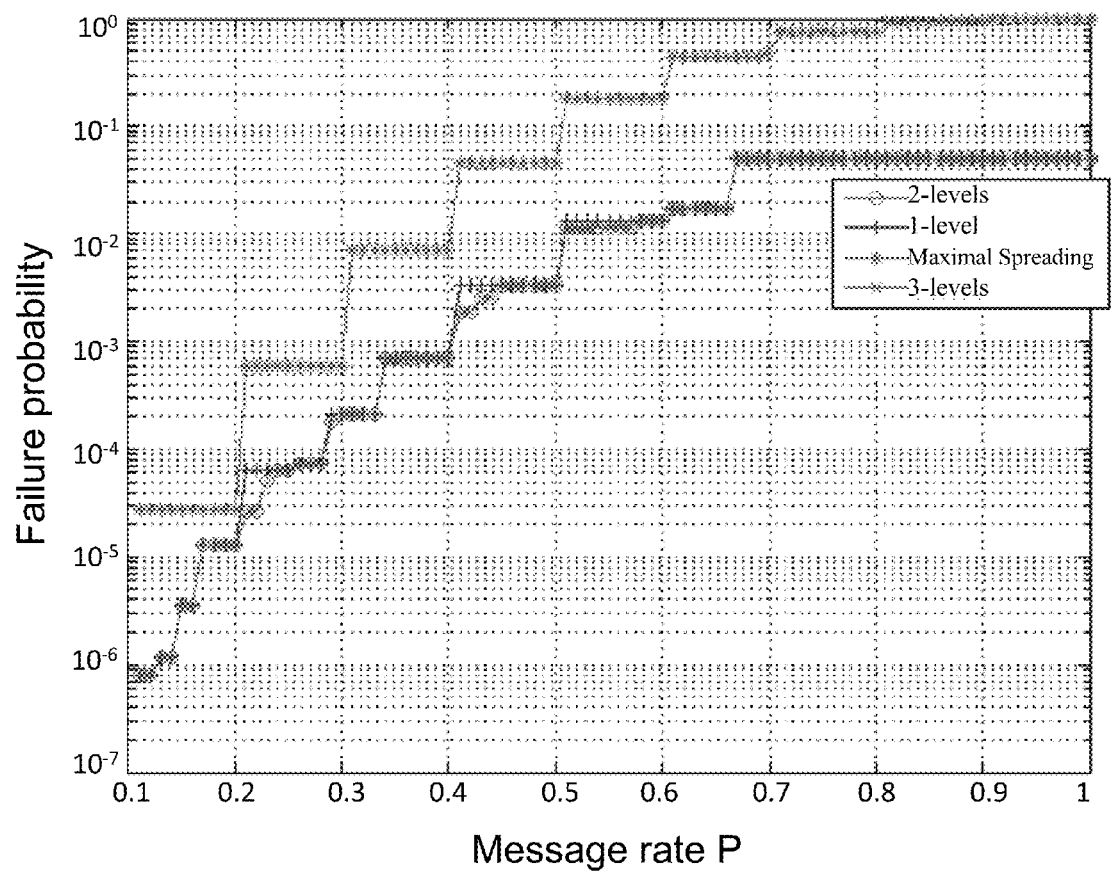
FIG. 15 shows a three-level symmetric allocation algorithm according to an embodiment of the present disclosure.

Given a fixed message rate of s=1, and a packet rate P in the range of 1 to 4, the failure probability plot in FIG. 14 can be obtained. Also, given a fixed packet rate of P=1, and a message rate s in the range of 0.1 to 1, the failure probability plot in FIG. 15 can be obtained.

Figure 17A:
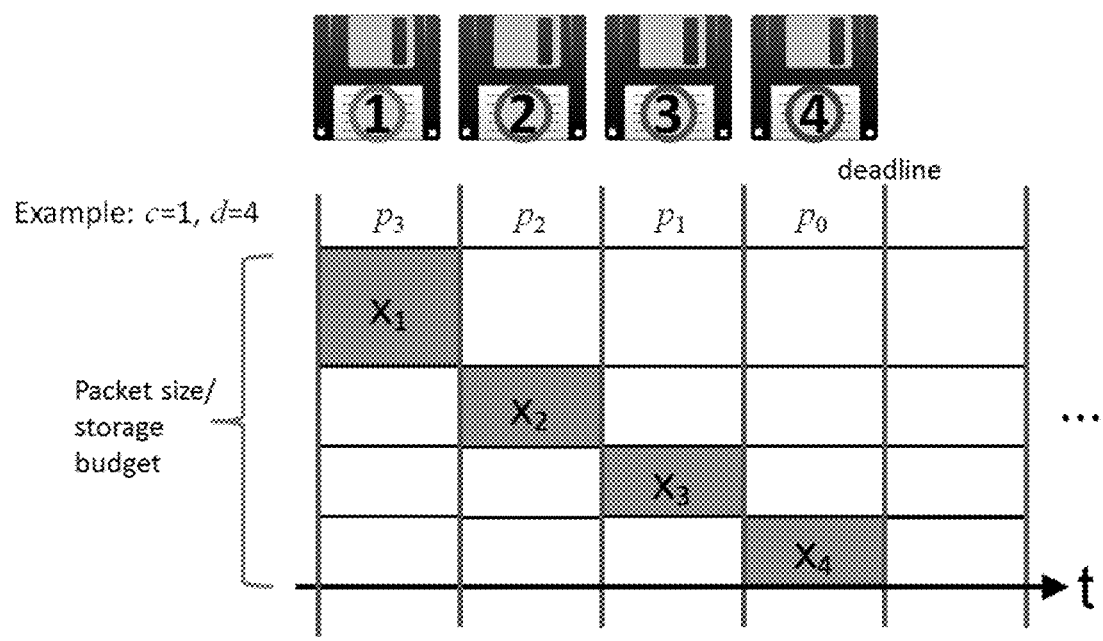
FIGS. 17A and 17B show storage allocated to streaming packets at two consecutive time steps for the case of a streaming packet construction where the packets are transmitted sequentially.
Figure 17B:
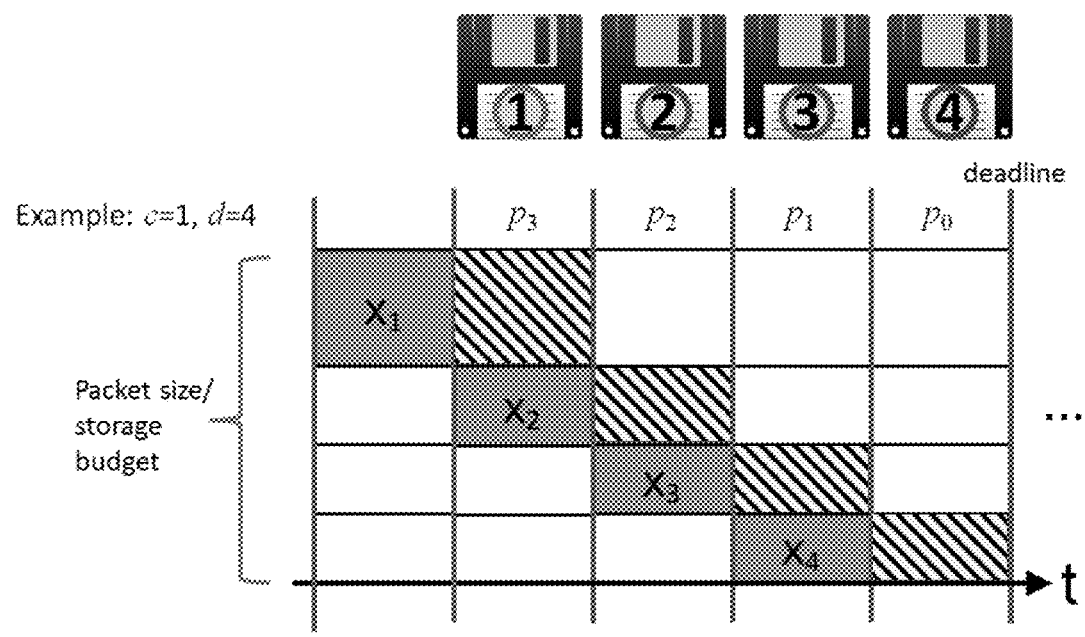

As related to the exemplary streaming construction per the various embodiments of the present disclosure, FIGS. 17A and 17B show an exemplary packet distribution for the case where c=1 and d=4. The columns in the graphs of FIGS. 17A and 17B represent sequentially transmitted packets, where the sum of all transmitted packets at a given time (e.g. t axis) is restricted by a budget (e.g. total packet size). The shaded boxes in FIGS. 17A and 17B represent the amount of data $(x_1, x_2, x_3, x_4)$ created at a time step 1 and spread across a number of transmitted packets $(p_0, p_1, p_2, p_3)$. These packets are transmitted according to an amount of delay within which they are to be decoded. The hatched box in FIG. 17B represents the amount of data from time step 2 (e.g. created at time step 2) in each transmitted packet. A packet transmitted at timestep i has probability $p_{j-i}$ of being received by timestep j, where for a delay value of $\Delta=j-i$, $p_\Delta$ is an increasing function of the delay $\Delta$. An optimal allocated packet size $(x_1, x_2, x_3, x_4)$ for each transmitted packet $(p_0, p_1, p_2, p_3)$, given the maximum total packet size (e.g. budget) that is available at each transmission and the decoding probability $p_\Delta$, can be derived by using the optimization problem (1), and therefore associated solutions can be as per the provided solutions in relation to the heterogeneous storage allocation problem. Given such teachings according to the present disclosure, and parallels provided between the two problems, the person skilled in the art will be able to apply such teachings in other systems comprising heterogeneous components.

According to the various embodiments of the present disclosure and discussed in the previous sections, various algorithms for finding multi-level symmetric allocations for the heterogeneous distributed storage allocation optimization problem given by the expression (1) are provided. As the number of levels and therefore the flexibility of the symmetric allocation increases, the running time of the algorithms (e.g. using a computer processor) also increase. However, even with few levels (e.g., one, two levels) and relatively low complexity and running time, the presented numerical experiments show that the proposed symmetric allocations according to the various embodiments of the present disclosure can still outperform existing more complex allocation schemes in many scenarios.

Hardware Consideration

With reference back to the distributed heterogeneous storage system presented in FIG. 1 of the present disclosure and described in the previous sections, the person skilled in the art readily understands that the storage nodes represented by a corresponding box (e.g. labeled "storage node i") in FIG. 1 can take the form of a variety of different combinations of hardware/firmware/software devices, such as to create the heterogeneous nature of the system represented in FIG. 1 without affecting the efficiency of the various provided algorithms. Each storage node can effectively be considered an entity capable of storing data, such as, for example, a single hard disk drive, a single computer-based workstation, a data center comprising networked servers, storage arrays, or a single internet service provider.

According to one exemplary implementation, each storage node can be a different cloud service provider wherein an associated virtual private server (VPS) and corresponding storage system can be used for communication with the source (110) and storage of the portion of the data object $x_1$.

Each such cloud service provider (e.g. storage node) can also have a known statistical uptime/downtime (e.g. node is available 80% or 70%, or . . . of the time) which can be further used to derive an associated access/reliability model (e.g. a cloud service is available with a probability $p_i$) for recovery of the data object via the data collector (115).

According to another exemplary implementation, each storage node can be a physical hard disk used in a data storage rack which is used as main storage for the source (110). For example, the source can be a server computer. Additionally, each hard disk can have an associated failure curve based, for example, on a mean-time-before-failure (MTBF) parameter provided by the hard disk manufacturer. Such MTBF of each hard disk and age of the hard disk can be used to derive a corresponding access/reliability model for recovery of a data object by the data collector workstation.

In some cases, the reliability/accessibility of the storage node can be a function of the quality of various component of the node. For example, a cheap hard disk drive, which can be a refurbished drive or one manufactured with lower grade components, can have a lesser reliability than a state of the art hard disk. As another example, a service provider using older infrastructure (e.g. hardware, computers, storage systems, cabling and communication links, etc. . . . ) can be less costly but have a worse reliability/accessibility than a provider using state of the art infrastructure. In such case, the optimization problem described by the expression (1) can take into account cost associated with the distributed heterogeneous storage space and minimize such cost while providing capability for recovery of the data object. The provided methods described in the various algorithms according to the present disclosure can therefore be used for reducing overall system cost and maintaining reliability.

The various communication links shown in the system of FIG. 1 connecting the various storage nodes and stations (110, 115) can be wired connections using conductors, such as twisted lines, coax cables, Ethernet cables, any type of cable using a conductor to carry electrical/optical signals, etc. . . . and/or wireless links using RF signals transmitted in the air. Some such links can be made using a combination of wired and wireless links.

In the various embodiments of the present disclosure, the source (e.g. 110 of FIG. 1, 1610 of FIG. 16) can be a computer processor running a program code (e.g. software) encompassing one or more of the various algorithms (e.g. FIGS. 4-7) provided by the present disclosure. Such program code can encompass the various steps according to the various algorithms of the present disclosure. Such computer processor may be implemented using any target hardware (e.g. FIG. 18, described later) with reasonable computing power and memory size, either off the shelf, such as a mainframe, a microcomputer, a desktop (PC, MAC, etc. . . . ), a laptop, a notebook, etc. . . . or a proprietary hardware designed for the specific task and which may include a microprocessor, a digital signal processor (DSP), various FPGA/CPLD, etc. The person skilled in the art readily knows of a variety of different configurations for such a computer processor, using different operating systems (OS) and/or hardware configurations. As such, the program code encompassing the one or more of the various algorithms can be adapted to any specific target hardware of the source.

The methods (e.g. single- and multi-level symmetric allocation algorithms and associated step by step flow charts as provided in FIGS. 4-7) and corresponding distributed storage communication systems described in the present disclosure may be implemented in hardware, software, firmware or combination thereof Features described as modules, nodes or components may be implemented together or separately using a combination of hardware, software and/or firmware. A software portion of the methods (e.g. flowcharts, algorithms) of the present disclosure may comprise a computer-readable medium which comprises instructions (e.g. executable program) that, when executed, perform, at least in part, the described methods, such as construction in part or in entirety of a symmetric allocation algorithm according to the various embodiments of the present disclosure. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA) or a combination thereof which can be integrated within a single integrated circuit (IC).

Figure 18:
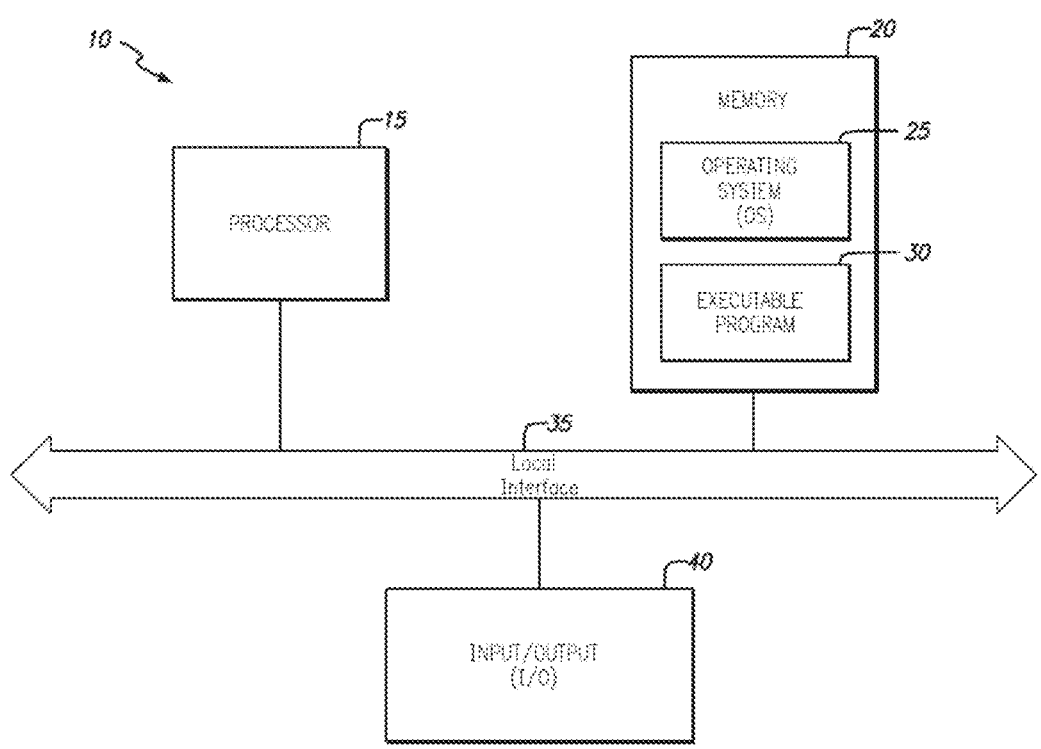
FIG. 18 shows an exemplary target hardware used for various storage nodes of the various distributed storage systems of the present disclosure.

FIG. 18 is an exemplary embodiment of a target hardware (10) (e.g. a computer system) for implementing one or more code/subgraph construction methods (e.g. a source node) and/or decoding of such encoded data (e.g. a relay/sink nodes) according to the various teachings of the present disclosure. This target hardware comprises a processor (15), a memory bank (20), a local interface bus (35) and one or more Input/Output devices (40). The processor may execute one or more instructions related to the implementation of the various provided coding construction methods (e.g. in entirety or partially) and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting bitstream data comprising messages to be encoded and/or decoded, inputting commands from a keyboard, outputting data to a display, or outputting encoded data packets (e.g. per provided methods) to be transmitted over a communication channel or inputting data packets from the communication channel. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 18. In some embodiments a plurality of processors may be used in a parallel configuration for added execution speed. In such a case, the executable program may be specifically tailored to a parallel execution. Also, in some embodiments the processor (15) may execute part of a method as provided in the present disclosure, and some other part may be implemented using dedicated hardware/firmware placed at an Input/Output location accessible by the target hardware (10) via local interface (35). The target hardware (10) may include a plurality of executable program

(30) (e.g. including a special communication program), wherein each may run independently or in combination with one another. These executable programs can comprise instructions, that when executed by the processor, perform at least part of a method (e.g. construction algorithm, encoding, decoding) presented in the present disclosure.

Such exemplary computer hardware as depicted in FIG. 18 can be implemented in an integrated chip (IC). According to some embodiments of the present disclosure, a symmetric allocation module implementing the various embodiments (e.g. algorithms) of the present disclosure, whether entirely or partially, can be implemented partially or in its entirety within an IC. Such IC can be used as part of a system to provide a symmetric allocation of heterogeneous systems according to the various embodiments of the present disclosure. A program stored in a memory (e.g. programmable memory) of the IC can be upgraded such as to fit an algorithm of the present disclosure according to, for example, a specific desired performance of allocation and/or algorithm execution speed based on the IC performance and/or other system requirements. The skilled person can think of various other possible hardware/software/firmware implementations of the systems presented in FIG. 1 and FIG. 16, whether partially or entirely, and using the provided symmetric allocation methods and algorithms whose flowcharts are depicted in FIGS. 4-7.

The examples set forth above are provided to give those of ordinary skill in the art a complete disclosure and description of how to make and use the embodiments of the distributed storage allocation for heterogeneous systems and related single- and multi-level symmetric allocation algorithms, and are not intended to limit the scope of what the inventors regard as their disclosure. Modifications of the above-described modes for carrying out the disclosure may be used by persons of skill in the information/coding/communication theory and processing, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The 9 references cited in the present disclosure and indicated by [.] and whose title, authors and publication are provided in the ensuing List of References, are incorporated herein by reference in their entireties.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] D. Leong, A. G. Dimakis, and T. Ho, "Distributed storage allocations," *IEEE Trans. Inf. Theory*, vol. 58, no. 7, pp. 4733-4752, July 2012.
[2] W. K. Lin, D. M. Chiu, and Y. B. Lee, "Erasure code replication revisited," in *Proc. Int. Conf. Peer-to-Peer Comput.* (P2P), September 2004.
[3] A. Tsirigos and Z. J. Haas, "Analysis of multipath routing—Part I: The effect on the packet delivery ratio," *IEEE Trans. Wireless Commun.*, vol. 3, no. 1, pp. 138-146, January 2004.
[4] "Analysis of multipath routing, Part 2: Mitigation of the effects of frequently changing network topologies," *IEEE Trans. Wireless Commun.*, vol. 3, no. 2, pp. 500-511, March 2004.
[5] J.-S. Wu and R.-J. Chen, "An algorithm for computing the reliability of weighted-k-out-of-n systems," *IEEE Trans. Rel.*, vol. 43, no. 2, pp. 327-328, June 1994.
[6] V. Ntranos, G. Caire, and A. G. Dimakis, "Allocations for heterogeneous distributed storage," in *Proc. IEEE Int. Symp. Inf. Theory (ISIT)*, July 2012.
[7] D. Leong and T. Ho, "Erasure coding for real-time streaming," in *Proc. IEEE Int. Symp. Inf. Theory (ISIT)*, Cambridge, Mass., USA, July 2012.
[8] D. Leong, A. Qureshi, and T. Ho, "On coding for real-time streaming under packet erasures," in *Proc. IEEE Int. Symp. Inf. Theory (ISIT)*, Istanbul, Turkey, July 2013.
[9] Y. Chen, J. Chen, and Y. Yang, "Multi-hop delay performance in wireless mesh networks," *MOBILE NETW APPL*, vol. 13, pp. 160-168, April 2008.

The invention claimed is:

1. A computer-based method for allocating storage in a heterogeneous storage system, the computer-based method comprising:
    providing a set of hardware storage nodes of known heterogeneous access probabilities;
    providing, via a computer, an objective function;
    providing, via a computer, a constraint;
    based on the constraint and the objective function, selecting, via a computer, one or more disjoint subsets of the set of hardware storage nodes, the one or more disjoint subsets comprising a plurality of hardware storage nodes; and
    based on the selecting, allocating, via a computer, a storage amount to the one or more disjoint subsets,
    wherein the allocating is based on the heterogeneous access probabilities of the plurality of hardware storage nodes of the one or more disjoint subsets and the constraint, and is obtained by spreading the storage amount over the plurality of hardware storage nodes of the one or more disjoint subsets such that each hardware storage node of each subset of the one or more disjoint subsets have a same amount of allocated storage different from an amount allocated to a hardware storage node of a different subset.

2. The computer-based method of claim 1, wherein the objective function is in correspondence of one or more of: a) a reliability of data retrieval, b) an accessibility of data and c) a cost of storage.

3. The computer-based method of claim 1, wherein the constraint is in correspondence of one or more of: a) a storage amount being less than or equal to a total available storage from the set of hardware storage nodes, b) a cost of storage, c) a reliability of data retrieval, and d) an accessibility of data.

4. The computer-based method of claim 1, further comprising:
providing, via a computer, a file;
based on the providing, encoding, via a computer, the file;
based on the encoding, obtaining, via a computer, a plurality of encoded files of a total size in correspondence of the budget; and
based on the obtaining, storing, via a computer, the encoded files on the selected one or more disjoint subsets,
wherein a size of each encoded file is matched to an amount of allocated budget determined by the allocating.

5. The computer-based method of claim 4, wherein the encoding is performed using of one of: a) a maximum distance separable (MDS) code, and b) a random linear code.

6. The computer-based method of claim 1, wherein a hardware storage node of a subset of the one or more disjoint subsets comprises one of: a) a hard disk, b) a computer system, c) a data server, d) a data center, e) an internet service provider, and f) a virtual private server (VPS).

7. The computer-based method of claim 1, wherein the selecting and the allocating is performed via a computer-based algorithm whose steps are provided via one or more of: a) the single-level symmetric allocation Algorithm 2 of FIG. 5, b) the two-level symmetric allocation Algorithm 3 of FIG. 6, c) the three-level symmetric allocation Algorithm 4 of FIG. 7, and d) a k-level symmetric allocation algorithm.

8. The computer-based method of claim 7, wherein the k-level symmetric allocation is an extension of the two-level and three-level symmetric allocation algorithms and wherein an associated basic storage block $S_k$ is given by:

$$S_k = \frac{T}{km_1 + (k-1)m_2 + \ldots + 2m_{k-1} + m_k},$$

wherein T is the budget and $m_i$ is a budget amount allocated to each hardware storage node of a level i of the k levels.

9. A computer-based system for distributed storage allocation, comprising:
a computer-based source configured to communicate over one or more communication links with a set of hardware-based storage nodes of known heterogeneous access probabilities, wherein the computer-based source is configured to execute a storage allocation algorithm to obtain an allocated storage over the plurality of hardware-based storage nodes, the algorithm performing the tasks of:
i) based on a provided budget and a provided objective function, select one or more disjoint subsets of the plurality of hardware-based storage nodes comprising a plurality of hardware-based storage nodes of the plurality of hardware-based storage nodes, wherein the budget specifies a portion of a total available storage size of the set of hardware-based storage nodes; and
ii) allocate the budget to the one or more disjoint subsets by spreading the budget over the plurality of hardware-based storage nodes of the one or more disjoint subsets such that each hardware-based storage node of each subset of the one or more disjoint subsets have a same amount of allocated budget different from an amount allocated to a hardware-based storage node of a different subset,
wherein the allocation of the budget is based on the heterogeneous access probabilities and the budget.

10. The computer-based system of claim 9, wherein the objective function is in correspondence of one or more of: a) a reliability of data retrieval, b) an accessibility of data and c) a cost of storage, and d) an available storage size limit.

11. The computer-based system of claim 9, wherein the storage allocation algorithm further comprises steps provided via one or more of: a) the single-level symmetric allocation Algorithm 2 of FIG. 5, b) the two-level symmetric allocation Algorithm 3 of FIG. 6, c) the three-level symmetric allocation Algorithm 4 of FIG. 7, and d) a k-level symmetric allocation algorithm.

12. The computer-based system of claim 11, wherein the k-level symmetric allocation is an extension of the two-level and three-level symmetric allocation algorithms and wherein an associated basic storage block $S_k$ is given by:

$$S_k = \frac{T}{km_1 + (k-1)m_2 + \ldots + 2m_{k-1} + m_k},$$

wherein T is the budget and $m_i$ is a budget amount allocated to each hardware storage node of a level i of the k levels.

13. A distributed storage system comprising:
the computer-based system of claim 9 configured to communicate over one or more communication links with a set of hardware-based storage nodes comprising a plurality of hardware-based storage nodes of known heterogeneous access probabilities; and
a plurality of hardware-based storage nodes of known heterogeneous access probabilities,
wherein the computer-based node is configured to distribute an encoded file of size equal to the budget over the plurality of hardware-based storage nodes based on the allocated storage provided by the storage allocation algorithm.

14. The distributed storage system of claim 13, wherein the encoded file is encoded via a computer-based encoding algorithm executed on the computer-based source and based on one of: a) a maximum distance separable (MDS) code, and b) a random linear code.

15. The distributed storage system of claim 13, wherein a hardware-based storage node of the plurality of hardware-based storage nodes comprises one of: a) a hard disk, b) a computer system, c) a data server, d) a data center, e) an internet service provider, and f) a virtual private server (VPS).

16. A computer-based method for real-time streaming of a plurality of independent messages over a communication link, the computer-based method comprising the steps:
i) providing via a computer, a message size s of the plurality of independent messages;
ii) providing via a computer, a message creation interval c based on a number of time steps, wherein the message creation interval defines the time interval between creation times of two consecutive messages;
iii) providing via a computer, a constraint specifying a budget, wherein the budget corresponds to a maximum size of an encoded packet transmitted at each time step;
iv) providing via a computer, a fixed decoding delay d in number of time steps, wherein the fixed decoding delay defines a delay with respect to a creation time of a message from the plurality of independent messages within which the message must be decoded, via a computer-based decoder, based on one or more transmitted packets;

v) providing via a computer, a heterogeneous access probability model defining a heterogeneous delay-dependent loss probability of a transmitted packet over the communication link;

vi) encoding, via a computer, a message of the plurality of independent messages; and vii) based on the steps i)-vi), generating via a computer, a plurality of packets in correspondence of the encoded message, and transmitting the plurality of packets sequentially over the communication link, wherein:

a message of the plurality of independent messages created at a time step i is allocated portions of space in packets transmitted at time steps i, i+1, . . . , i+d chosen according to the heterogeneous access probability model;

the message is coded across the allocated portions of the space in packets at time steps i, i+1, . . . , i+d using an erasure correcting code; and the message is decoded by a computer-based decoder within the fixed decoding delay from a creation time of the message.

17. The computer-based method of claim 16, wherein the allocated portions of the space in packets is obtained via a computer-based allocation algorithm whose steps are provided via one or more of: a) the single-level symmetric allocation Algorithm 2 of FIG. 5, b) the two-level symmetric allocation Algorithm 3 of FIG. 6, c) the three-level symmetric allocation Algorithm 4 of FIG. 7, and d) a k-level symmetric allocation algorithm.

* * * * *